(No Model.)

S. WILSON.
FISHING WHEEL.

No. 264,395. Patented Sept. 12, 1882.

WITNESSES:
Gustave Dietrich
C. Sedgwick

INVENTOR:
S. Wilson
BY Munn & Co
ATTORNEYS.

UNITED STATES PATENT OFFICE.

SAMUEL WILSON, OF DALLAS, IOWA.

FISHING-WHEEL.

SPECIFICATION forming part of Letters Patent No. 264,395, dated September 12, 1882.

Application filed March 28, 1882. (No model.)

*To all whom it may concern:*

Be it known that I, SAMUEL WILSON, of Dallas, in the county of Marion and State of Iowa, have invented a new and Improved Fishing-Wheel, of which the following is a full, clear, and exact description.

This invention consists of a wheel constructed with nets embraced in four or more sectors thereof, to each of which nets an opening is made from the periphery or near it, and from which there is an escape-passage from the center of the wheel, and at one side, to a chute leading to a cage-net, all so arranged that the wheel being located in a fishway to be rotated by the water flowing against it or by another wheel attached to the shaft outside of the fishway, the mouths of the passages into the nets of the wheel will open at the rear of the wheel to the fish ascending the stream, to be entered by them as they attempt to pass under the wheel, whereby as that side of the wheel rises the fish will be caught, carried up, and shunted out through the aforesaid side central passages into the chute, by which they will be delivered into the trap-cage, to be taken out at pleasure, as hereinafter more fully described.

Reference is to be had to the accompanying drawings, forming part of this specification, in which similar letters indicate corresponding parts in all the figures.

Figure 1:
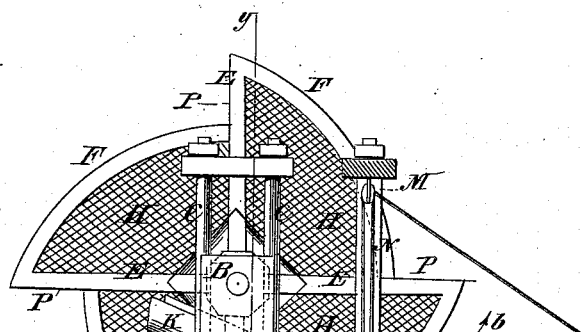
Figure 3:
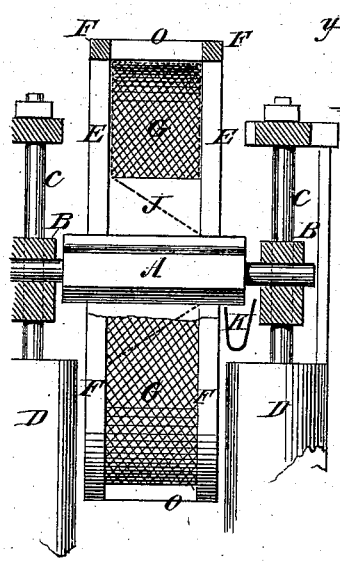
Figure 4:
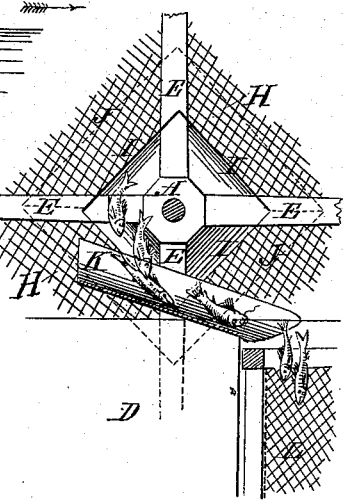
Figure 2:
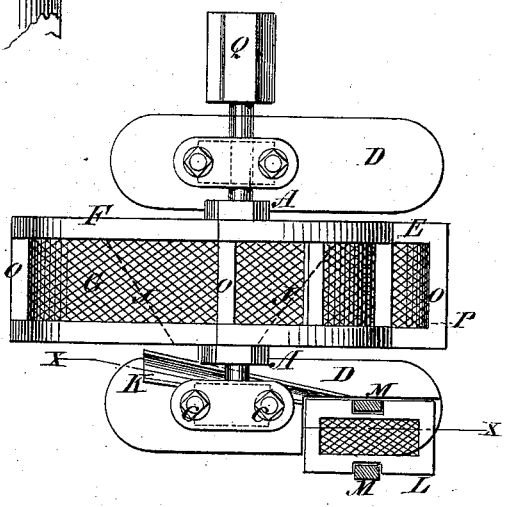

Figure 1 represents a side elevation of my improved fishing-wheel and trap-cage as in position for operation. Fig. 2 is a plan view. Fig. 3 is a section on line *y y* of Fig. 1; and Fig. 4, a detail in sectional elevation of Fig. 2, line *x x*, on a larger scale, illustrating more clearly the means of discharging the fish from the nets of the wheel into the trap-cage.

A represents the shaft of a large wheel, of twenty feet diameter, or more if preferred, and suitable width, the said shaft being mounted in bearings B, which are in practice to be arranged so as to be raised and lowered as the volume of water varies, the arrangement being by preference two strong vertical and parallel posts, C, at each side of the wheel and also at each side of the shaft, as shown, between which the boxes B are confined and guided, so that by screws, levers, or other means they may be raised from below, or by the same or other means from above, the said posts being strongly supported in walls, piers, or the like foundations D.

From the shaft strong arms E project radially the length and in numbers required—say about four pairs, though if the wheel is larger more may be used. Instead of circular rims to these arms, I prefer to make the same in sections, F, connected at the front ends—considering the direction of the wheel's motion—to the outer ends of the arms, but receding rearwardly toward the center of the wheel, and being connected to the next arms about as much short of the outer ends as the required width of the mouths P of the nets. Outside of these rims F the space is closed by wire or other netting G; also, the sides between said rims and the arms at H, except in the central position of the side out of which the fish are to be discharged, where a small opening, I, is left all round for the discharge from all of the nets. Through this opening, Fig. 4, and by the dotted lines J of Figs. 2, 3, and 4, may be seen the webs of netting by which the interior of the wheel-space is separated into four separate nets, and also how the said webs are inclined toward passage I to discharge the fish from the wheel into chute K for delivery into the cage-net L, to be retained until wanted. The cage-net is located between a couple of posts, M, between which it slides up and down, to be raised out of the water by tackle N when the fish are to be removed.

The cage is designed to have meshes sufficiently large to allow all small fish to escape alive, and the wheel-nets and discharge-spouts are to be constructed with special reference to the handling of the fish without injury, so that the small ones escaping will not suffer by the machine.

While I prefer, as before stated, to construct the rim in sections F, arranged eccentrically to the axis of the wheel, for the reason that the netting G on the periphery tends in that arrangement to lift and direct the fish toward the center better, yet the rims may be continuous and circumferential to the wheel, if desired. The rims are stayed by suitable cross-bars for lateral stiffness.

The construction of the wheel may be varied considerably, the essential object being to provide it with a series of nets with a mouth, P, to each.

It will be seen that with a wheel of this construction located in a fishway, as shown, between piers D, contrived to cause a swift current in the direction of arrow $a$ and turn the wheel in the direction of arrow $b$, the fish trying to pass up the stream will enter the nets, and be thereby delivered into the trap-net, as above described.

If desired, the shaft may be extended beyond the outermost pier, as shown at Q, Fig. 2, and have paddles attached to aid in the rotation of the wheel. Two such wheels may be applied to a screw-steamboat by a shaft located abeam of the boat, with gear to rotate the wheels against the water for fishing in that way, if desired.

In the fishway the wheel should be located so as to run close to the bottom, to prevent the fish from escaping under it from the habit of swimming close to the bottom.

The tackle for hoisting the wheel (not shown) will be used mainly in case of raising the wheel for protection in time of floods.

Having thus fully described my invention, what I claim as new, and desire to secure by Letters Patent, is—

1. A fishing-wheel having sector-nets provided with mouths P and discharge-opening I, in combination with a discharge-chute and a cage-net, substantially as and for the purpose set forth.

2. The combination, with a fishing-wheel having catching-nets, of cage-net arranged to move up and down in guideways, and provided with hoisting and lowering tackle, substantially as and for the purpose set forth.

SAMUEL WILSON.

Witnesses:
S. P. AYRES,
R. M. LOGAN.